United States Patent [19]
Canetti et al.

[11] Patent Number: 5,412,723
[45] Date of Patent: May 2, 1995

[54] MECHANISM FOR KEEPING A KEY SECRET FROM MOBILE EAVESDROPPERS

[75] Inventors: Ran Canetti, Tel Aviv, Israel; Amir Herzberg, New York, N.Y.

[73] Assignee: International Business Machines Corporation, Armonk, N.Y.

[21] Appl. No.: 203,973

[22] Filed: Mar. 1, 1994

[51] Int. Cl.⁶ .......................... H04L 9/08; H04L 9/00
[52] U.S. Cl. ............................. 380/21; 380/4; 380/23; 380/25; 380/49; 380/50
[58] Field of Search ................. 380/4, 9, 21, 43, 49, 380/50, 23, 24, 25; 340/825.31, 825.34

[56] References Cited

U.S. PATENT DOCUMENTS

| | | | |
|---|---|---|---|
| 4,182,933 | 1/1980 | Rosenblum | 380/21 |
| 4,876,716 | 10/1989 | Okamoto | 380/21 |
| 4,972,472 | 11/1990 | Brown et al. | 380/21 |
| 5,081,677 | 1/1992 | Green et al. | 380/21 |
| 5,146,498 | 9/1992 | Smith | 380/21 |
| 5,177,791 | 1/1993 | Yeh et al. | 380/21 X |
| 5,208,859 | 5/1993 | Bartucci et al. | 380/21 X |
| 5,325,432 | 6/1994 | Gardeck et al. | 380/21 |

OTHER PUBLICATIONS

M. Bellare et al.; "Entity Authentication and Key Distribution"; Advances in Cryptology: Proc. of Crypto 93, Aug. 1993.

*Primary Examiner*—Bernarr E. Gregory
*Attorney, Agent, or Firm*—Whitham, Curtis, Whitham & McGinn

[57] ABSTRACT

A method is provided which allows a set of servers to maintain a set of keys, shared with a client, in the presence of mobile eavesdroppers that occasionally break into servers and learn the entire contents of their memories. Static and dynamic schemes maintain secret keys common to the user and each of several servers in the presence of a mobile, transient adversary that occasionally breaks into servers in order to gather information on the users' secret keys. The schemes use periodic "refreshments" of every user's private keys. In each round the servers involve in a computation in which each server computes a new private key to be shared with the user, in a way that allows the user to keep track of the changing keys without any communication with the servers. The schemes are very efficient. In particular, a user has to interact only with one server in order to obtain a session key. The user may choose the server with whom it wants to interact. The method may be used to securely generate random numbers (i.e., using the keys as random numbers).

12 Claims, 6 Drawing Sheets

MECHANISM FOR KEEPING A KEY SECRET FROM MOBILE EAVESDROPPERS

BACKGROUND OF THE INVENTION

1. Field of the Invention

The present invention generally relates to a method that allow a set of servers to maintain a set of keys, shared with a client, in the presence of mobile eavesdroppers that occasionally break into servers and learn the entire contents of their memories, and more particularly to efficient schemes for maintaining secret keys common to the user and each of several servers based on periodic key updates. Another application of the invention is to securely generate random numbers in the presence of mobile faults.

2. Description of the Prior Art

The need for ensuring secure communication over insecure channels is becoming increasingly acute. For instance, users ("clients") in a multiuser system may frequently wish to, say, authenticate the identity of their party for conversation, to authenticate a specific message, or even to exchange encrypted messages. Efficient implementations of such primitives for secure communication require the involved parties to first generate a common, secret session key.

A standard solution to the session keys generation problem uses a secure trusted entity, or a server. The system is initialized so that each user has a secret key that is known only to itself and the server. Now, in order to generate a session key, the involved parties engage in a protocol with the server.

A major drawback of the server method is that it hinges on the absolute security of the sever. Namely, if this server is broken into (i.e., the contents of the server's memory becomes known to an adversary), then all the private keys are revealed and the security of the entire system collapses.

Consequently, a scheme is required, in which the security of the system is not compromised even when individual components are broken into. We note that there exists an alternative way for generating secure session keys; namely, use public key cryptographic primitives (e.g., the Revist, Shamir, Adelman (RSA) algorithm). This solution eliminates the need for interacting with a server for generating each session key. However, a secure server is still needed in order to authenticate the public keys. Furthermore, public key cryptography is computationally intensive and relies on stronger computational assumptions.

A straightforward way to enhance the security of the server mechanism may be to "duplicate" the server. Namely, use several servers and have every user execute the interaction protocol with each server. This solution has two major drawbacks. First, it is highly inefficient, since the party must interact with several servers in order to obtain each session key. Second, once every server has been broken into at some time, the system is no longer secure.

SUMMARY OF THE INVENTION

It is therefore an object of the present invention to provide a method that allow a set of servers to maintain a set of keys, shared with a client, in the presence of mobile eavesdroppers that occasionally break into servers and learn the entire contents of their memories.

According to the invention, efficient schemes for maintaining secret keys common to the user and each of several servers in the presence of a mobile, transient adversary that occasionally breaks into servers in order to gather information on the users' secret keys. The idea underlying the schemes is periodic "refreshments" of every user's private keys. An "ideal" refreshment scheme would proceed as follows. Initially, the user has a common, private key with each server (i.e., this key is known only to the user and the specific server). Every round (say, every day or every fifth time the user approaches the servers), a new set of keys is miraculously handed to the user and the servers. Namely, each server now has a new key, which is not known to the other servers (but is known to the user), and is independent of the old keys. Such an ideal scheme is clearly "the most that can be hoped for"; that is, the adversary has no knowledge of the key common to the user and some server at some round, unless it breaks into this server at this very round.

The schemes according to the invention achieve exactly the same situation, as long as the adversary is limited to "reasonable" computational abilities and its attacks on the servers are limited. That is, in each round the servers involve in a computation in which each server computes a new private key to be shared with the user, in a way that allows the user to keep track of the changing keys without any communication with the servers. Furthermore, computationally bounded adversaries cannot distinguish between keys computed using the schemes according to the invention and keys distributed using the ideal scheme described above; i.e., every key is known to one server only and is independent of the old keys.

The schemes according to invention are very efficient. In particular, a user has to interact only with one server in order to obtain a session key. The user may choose the server with whom it wants to interact. For this application, we do not require the ability of the user to compute the value held by the servers.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Definitions

Figure 1:
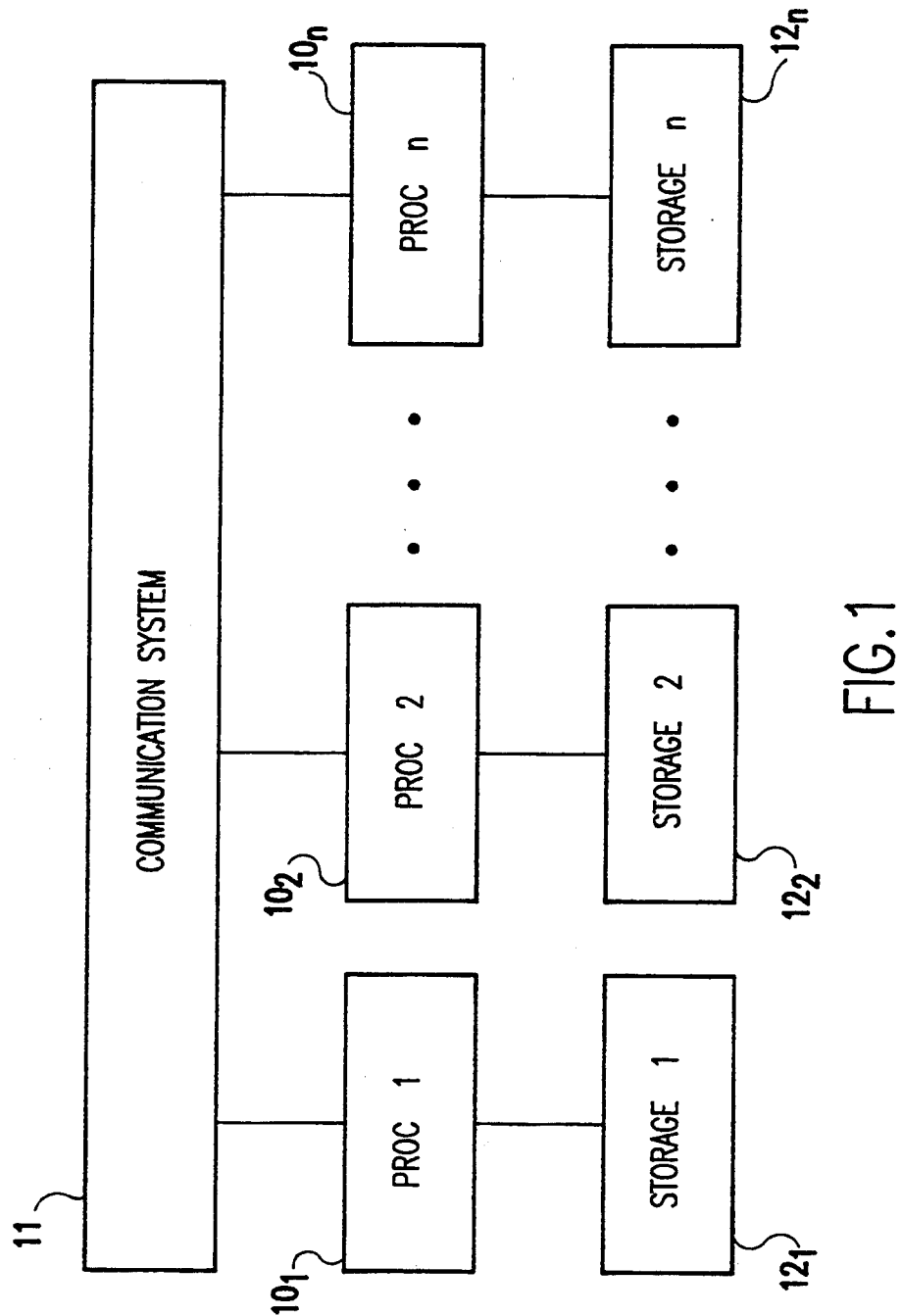
FIG. 1 is a block diagram showing a distributed data processing system of the type on which the invention may be implemented.

For the communication network, we assume for purposes of simplification that every two servers are connected via a private and secure communication channel. In general, the channel does not have to be private or secure. We further assume for purposes of simplification that the servers are synchronized. Namely, the communication proceeds in rounds; furthermore, all parties have access to a common global clock. In general, such precise synchronization is not required.

The adversary may occasionally break into servers. Upon breaking into a server, the entire contents of the server's memory becomes known to the adversary. In each round, the adversary may break into different servers. For purposes of simplification, we postulate gossip adversaries; namely, we assume that the adversary does not alter the behavior of a server that is broken into, it merely "gathers information". We note that in our schemes, even Byzantine adversaries (i.e., adversaries that may alter the behavior of "corrupted" servers) do not gather any information that gossip adversaries do not gather. Furthermore, the only malfunction they are able to cause is "denial of service".

We bound the number of servers broken into. We say that an adversary is statically t-limited if the total number of servers broken into during the entire computation is at most t. We say that an adversary is dynamically t-limited if in each round of the computation at most t servers are broken into.

Informally, we say that a key refreshment scheme is secure if it is equivalent to the ideal scheme (i.e., the scheme in which in each round every server is miraculously given a "fresh", common private key with the user). In other words, a scheme is statically t-secure (respectively, dynamically t-secure) if any polynomial time bounded statically t-limited (respectively, dynamically t-limited) adversary has no information on the key common to the user and some server at some round, unless this server is broken into in this round.

Our constructions use pseudorandom functions. We briefly sketch the definition of a pseudorandom function family. For a fuller definition, see for instance Mihir Bellare and Phil Rogaway, "Models of entity authentication", Advances in Cryptology: Proc. of Crypro 93, August 1993. Let s be a security parameter. For every value of s, let $$F_s = \{f_a: \{0,1\}^{y(s)} \to \{0,1\}^{z(s)}\}_{a=1}^{w(s)}$$

be a family of functions. Intuitively, we say that the collection $\mathscr{F} = \{F_s\}$ is pseudorandom if no polynomial time bounded adversary can distinguish between a function chosen at random from $F_s$ and a random function (from $\{1,0\}^{y(s)}$ to $\{0,1\}^{z(s)}$), for every large enough s. We note that pseudorandom collections exist, given that one-way functions exist. In fact, we need only a simple case where the domain and the range are both $\{0,1\}^k$ where k is some security parameter. For k=64, the data encryption statndared (DES) cryptosystem, with the key serving as the input, is believed to be a good candidate. There are standard efficient extensions for larger values of k.

Overview

We disclose efficient schemes for maintaining secret keys between a client and several servers, in the presence of mobile eavesdroppers which may "break into" servers (and, thus, learn the contents of the server's memory). Our schemes are based on periodic key updates. They assure that the key common to the client and a server remains secure (first scheme), as long as the server has not been broken into in the current period and there exists a server that has never been broken into or as long as in each time period there exists a server that has not been broken into (second scheme). The second scheme remains secure even if each one of the servers is broken into at some time, but not all at the same period.

Implementation

Referring now to the drawings, and more particularly to FIG. 1, there is shown a typical distributed data processing system, sometimes referred to as a client-/server network, comprising a plurality of servers and clients connected via a communication network. A client/server system is a distributed system comprising a plurality of processors $10_l$ to $10_n$ interconnected by a communication network 11. The communication network 11 may be, for example, a local area network (LAN), a wide area network (WAN) or other similar network. The processors may be configured as clients or servers or both and are provided with respective storage devices $12_l$ to $12_n$, some or all of which may be accessible all or less than all the processors. This type of architecture makes use of the "distributed intelligence" of the servers and clients (i.e., workstations) as intelligent, programmable devices, thus exploiting the full computing power of each. The advantage of the client-/server architecture is that the clients and servers work together to accomplish the processing of the application, thereby increasing the processing power. Such a distributed data processing system may be connected as a local area network (LAN) or wide area network (WAN), and the servers may be microcomputers, minicomputers or mainframes or a combination. Thus, it will be appreciated that the system shown in FIG. 1 is generic in its illustration, and in a specific installation may be considerably more complex. This environment provides an efficient use of processing power, but at the expense of vulnerability to attack by mobile eavesdroppers which may intercept communications between processors at any point in the communication system 11 and which may sporadically gain illegitimate access and control of some servers and clients. For the present invention, there is no substantial difference between clients and servers, and here we discuss only servers.

We describe our constructions for secure key refreshment. The protocols are described for one user. In a real system, the protocols are to be invoked once for each user. Initially, each server $s_i$ has a secret master key, $k_i$, which is known only to $s_i$ and the user, u. This key may have been chosen and distributed externally upon the introduction of the user to the system.

According to a first embodiment of the invention, the scheme, when applied to a system of n servers, is statically (n−1)-secure. Each server has a different round key for each round. This round key is used as the secret key common with the user for this round. In each round, each server's new round key is computed based on information received from all the servers. Let $k_{i,l}$ be server s/s round key in round l. Then, we let $$k_{i,l} = \bigoplus_{j=1}^{n} f_{k_j}(l \circ i), \quad (1)$$

where $\{f_k(o)\}$ is a pseudorandom function family (i.e., taken from a pseudorandom collection), and l o i denotes the concatenation of l and i. Namely, at each round, l, each server $s_i$ computes $k_{i,l}$ after receiving $f_{ki}$ (loj) from all servers $s_j$, and then computes (l). l can be any time stamp, rather than just the round number.

Note that the user, knowing all the keys $k_l \ldots k_n$, can, given a server $s_i$ and a round l, easily compute $k_{i,l}$, without need of communication. Furthermore, in rounds where the user does not wish to communicate with the servers, neither the user nor the servers need to compute the corresponding round keys.

Figure 2:
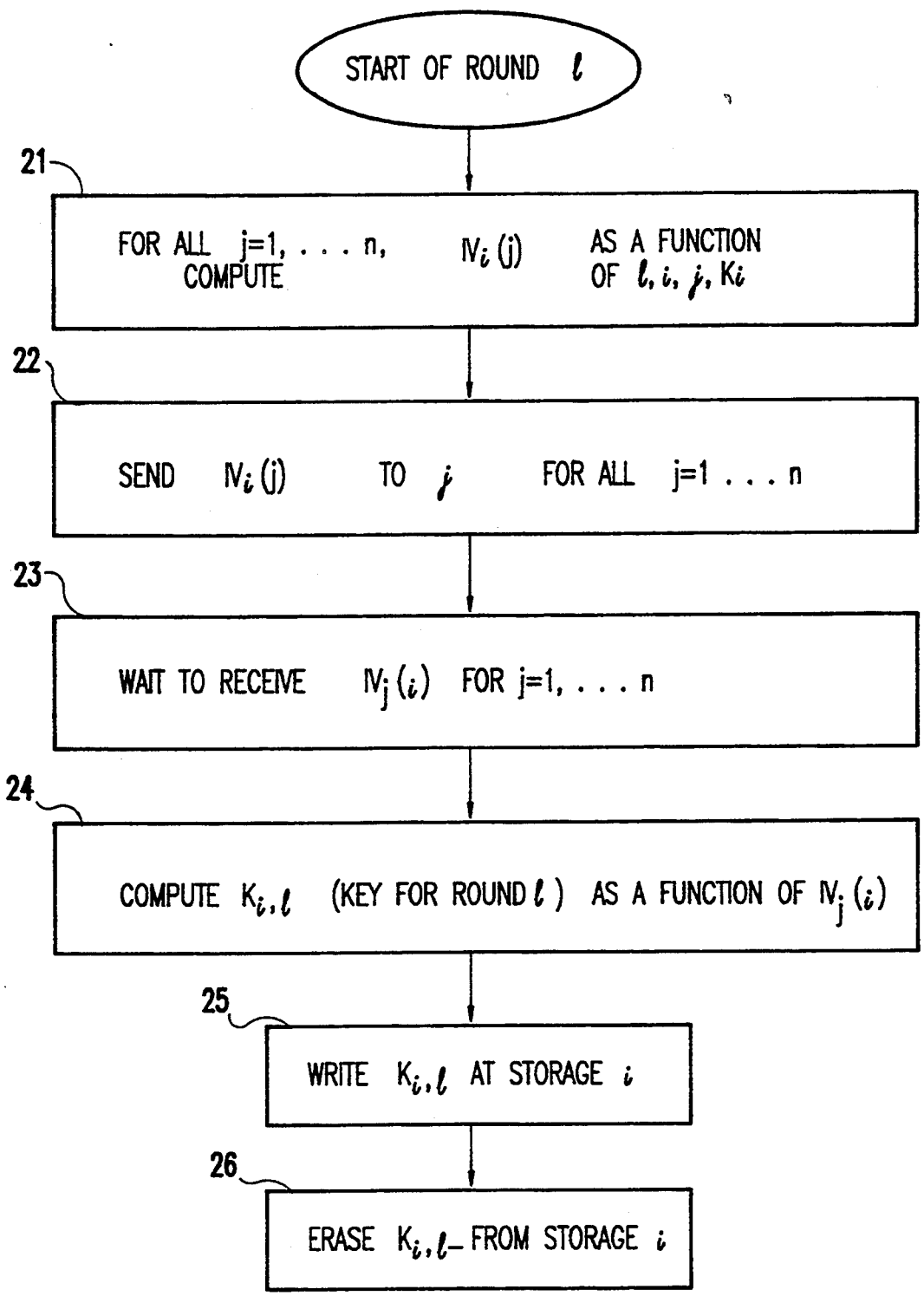
FIG. 2 is a flow chart of the process according to a first preferred embodiment of the invention.

The process is shown in FIG. 2, to which reference is now made. At the start of round l, intermediate values are computed in function block 21. More specifically, for all $j = 1, \ldots, n$, intermediate values $IV_i(j)$ are computed as a function of l, i, j, and/or/ $k_i$ and temporarily held in registers or sections of a register. The intermediate values are then sent to all processors, i.e., servers, $s_j$ for all $j = 1, \ldots, n$ in function block 22. The processor then waits in function block 23 to receive the intermediate values $IV_j(i)$ from the other processors. When the intermediate values $IV_j(i)$ have been received, they are held in registers or sections of a register. The received values $IV_j(i)$ are then used in function block 24 to compute the key for round l, $k_{i,l}$. The key for round l is then written to storage of processor $s_i$ in function block 25. Only after the key for round is written to storage is the key for the preceding round, $k_{i,l-1}$, erased from storage in function block 26.

In the second embodiment, the scheme, when applied to a system of n servers, is dynamically (n−1) secure. In the dynamic scheme, each server uses its round key of the previous round, instead of the master key, as the index for the function in the pseudorandom family. Namely, in round 1, each server $s_i$ lets $k_{i,1} = k_i$. In round $l > 1$, each server $s_i$ sends the intermediate function $f_{ki,l-1}$(loj) to each server $s_j$, and then computes $$K_{i,l} = \bigoplus_{j=1}^{n} f_{ki,l-1}(loi.) \quad (2)$$

As in the static secure scheme, the user, knowing all the keys $k_1 \ldots k_n$, can, give a server $s_i$ and a round l, compute $k_{i,l}$, without need of communication. However, the user (as well as the servers) has to follow the computation round by round. Namely, assume the user did not wish to communicate with the servers in rounds $1 \ldots l'$. Then, in round $l+1$, the user has to compute $n(l'-l+2)$ equations of type (2).

Figure 3:
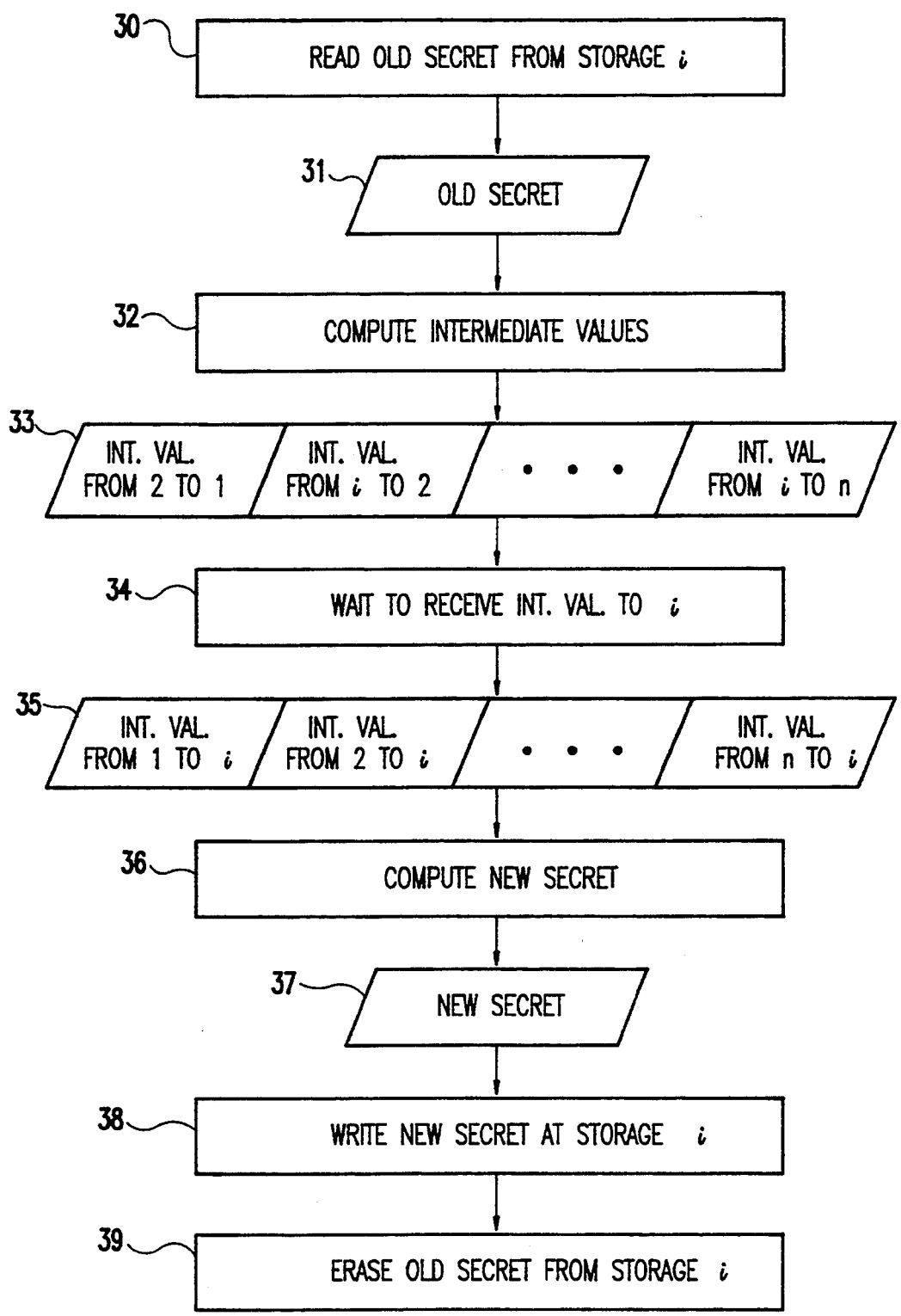
FIG. 3 is a flow chart of the process according to a second preferred embodiment of the invention.

FIG. 3 shows the general scheme of the second embodiment. The process begins by reading the old secret key from storage in function block 30 and temporarily holding the old secret key in a register in operation block 31. The value of the old secret key temporarily held in the register is then used to compute in function block 32 a plurality of intermediate values, one for each of the processors including the processor making the computation. The computed intermediate values are loaded into registers or register sections and transmitted on the communication network in operation block 33. The processor then waits in function block 34 to receive the computed intermediate values from the other processors, and the received values are held in corresponding registers or register sections in operation block 35. Now, using the received intermediate values, the processor computes the new secret key for the round in function block 36, and temporarily holds the computed new secret key in a register in operation block 37. The new secret key is then written to storage in function block 38, and only then is the old secret key erased from storage in function block 39.

Figure 4:
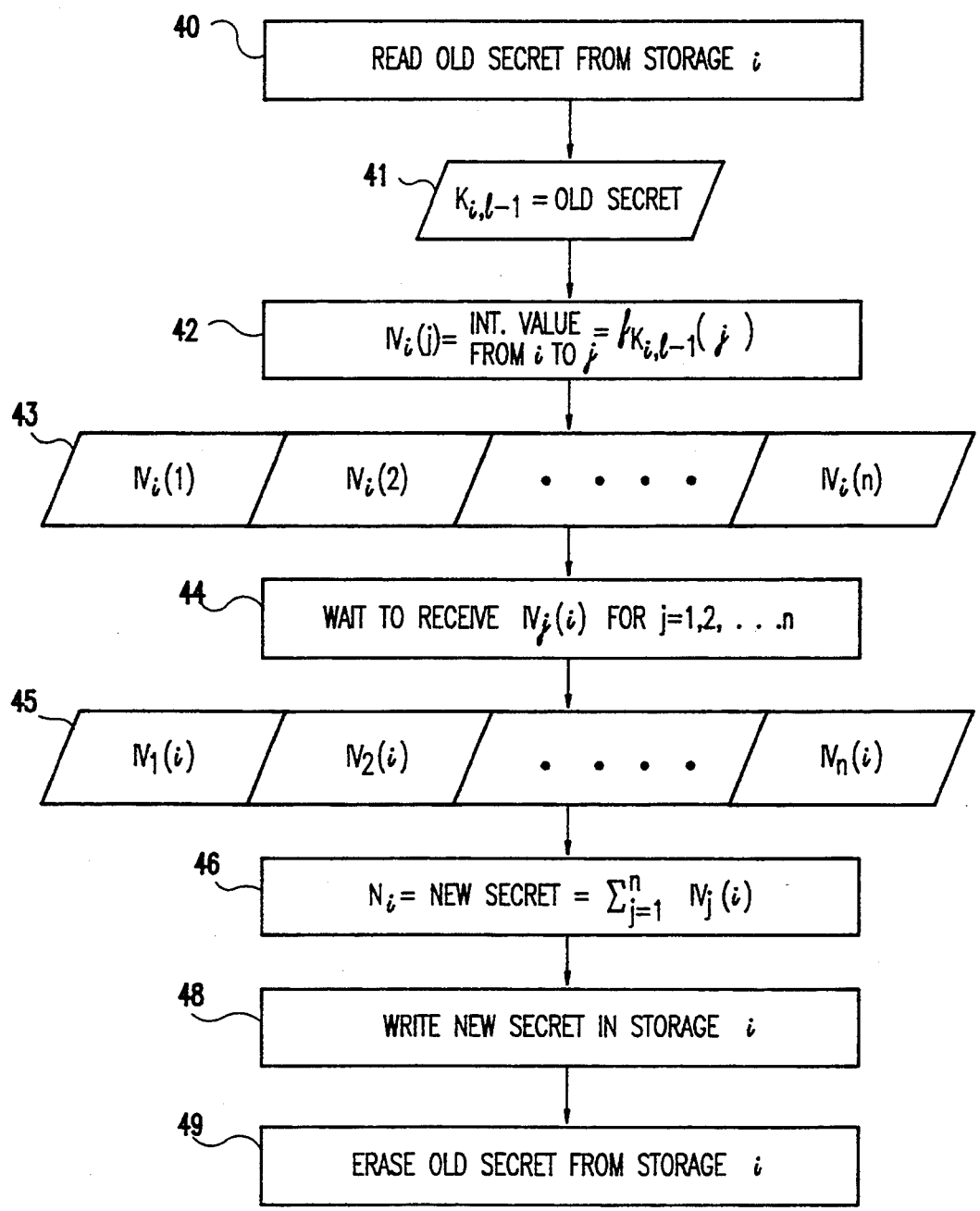
FIG. 4 is a flow chart, similar to FIG. 3, showing in more detail a specific implementation of the second embodiment of the invention.

FIG. 4 illustrates in more detail the preferred implementation of the second embodiment. More specifically, the old secret key $k_{i,l-1}$ is read from storage in function block 40 and temporarily held in a register in operation block 41. The value of the old secret key temporarily held in the register is then used to compute in function block 42 a plurality of intermediate values $IV_i(j)$ according to $$IV_{i(j)} = \underset{\text{FROM } i \text{ TO } j}{INT \text{ VALUE}} = f_{ki,l-1}(j).$$

The computed intermediate values $IV_i(1) \ldots IV_i(n)$, where n is the number of processors, are loaded into registers or register sections and transmitted on the communication network in operation block 43. The processor $s_i$ then waits in function block 44 to receive the computed intermediate values from the other processors, and the received values $IV_1(i) \ldots IV_n(i)$ are held in corresponding registers or register sections in operation block 45. Now, using the received intermediate values, the processor computes the new secret key for the round in function block 46, as $$N_i = \text{NEW SECRET} = \sum_{j=1}^{n} IV_j(i),$$

where the sum operation is performed using either the exclusive OR (XOR) or modular addition or an equivalent method. The new secret key, $N_i$, is temporarily held in a register in operation block 47. The new secret key is then written to storage in function block 48, and only then is the old secret key erased from storage in function block 49.

Figure 5:
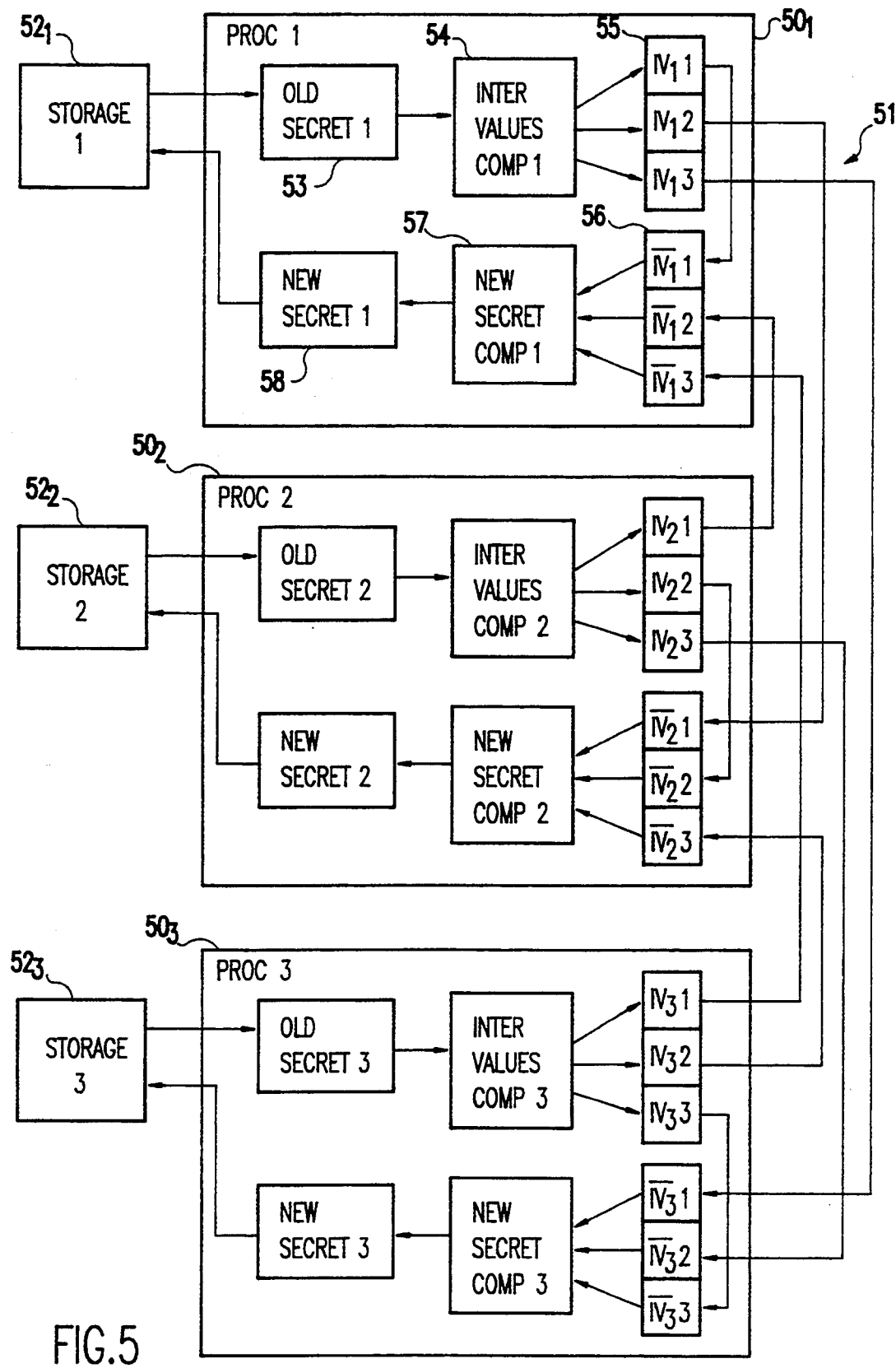
FIG. 5 is a block diagram showing a three-processor system in which the second embodiment of the invention is implemented.

As a more concrete example, consider the three processor system shown in FIG. 5. The system shown is similar to the general case shown in FIG. 1 and comprises processors $50_1$, $50_2$ and $50_3$ connected by a communications network 51. Each of the processors $50_i$ is connected to a corresponding one of the storage devices $52_1$, $52_2$ and $52_3$. Internally, each of the processors $50_i$ are essentially identical, and therefore description will be made of processor $50_1$ as typical of the other two processors. Each processor includes a storage access method and register 53 to access the old secret key from the processor's storage device 52. A computation unit 44 computes the intermediate values $IV_11$, $IV_12$ and $IV_13$, and these values are loaded in a register 55. One of the intermediate values $IV_11$ is loaded directly into a section of register 46 while the other two intermediate values are transmitted to the corresponding one of the other two processors. When the processor $50_1$ has received the intermediate values $IV_22$ and $IV_33$ computed by processors $50_2$ and $50_3$, respectively, these values are also stored in register 56. A second computation unit 57 now computes the new secret key and temporarily stores it in a register of storage access method 58. The storage access method 58 and storage access method 53 could be one in the same, in which case separate registers must be provided to temporarily hold the old secret key and the just computed new secret key. Now, the storage access method writes the new secret key to storage $52_1$. This may be done with a read after write confirmation to insure that the new secret key has been correctly written to storage device $52_1$. Once the write operation has been completed, the old secret key is erased from storage device $52_1$ by the storage access method 58.

The two schemes of the first and second embodiments can be combined in order to reach a compromise between efficiency and security. To do this, we define a special type of round, a major round, for instance, let every 10th round be a major round. In non-major rounds, the servers compute their keys for this round using the first (static) scheme. In major rounds, the servers compute their keys using the second (dynamic) scheme.

On one hand, the static security holds for each round, where dynamic security hold for major rounds only. On the other hand, when communicating with the servers after a long silence, the numbers of equations of the type (2) that need to be computed by the user is proportional only to the number of major rounds that went by.

The applications of the schemes presented have to preserve the secrecy of the keys $k_{i,l}$ supplied by the schemes. Each of these schemes may be extended to allow the use of the keys by applications which may not preserve the secrecy of the keys. More specifically, instead of supplying the application directly with $k_{i,l}$ computed according to the schemes, the application would receive $\bar{k}_{i,l}$, a value derived from $k_{i,l}$. For example, $\bar{k}_{i,l} = f_{k_{i,l}}(x)$ where x is a constant or a function of $k_{i,l}$, i, and/or l.

Figure 6:
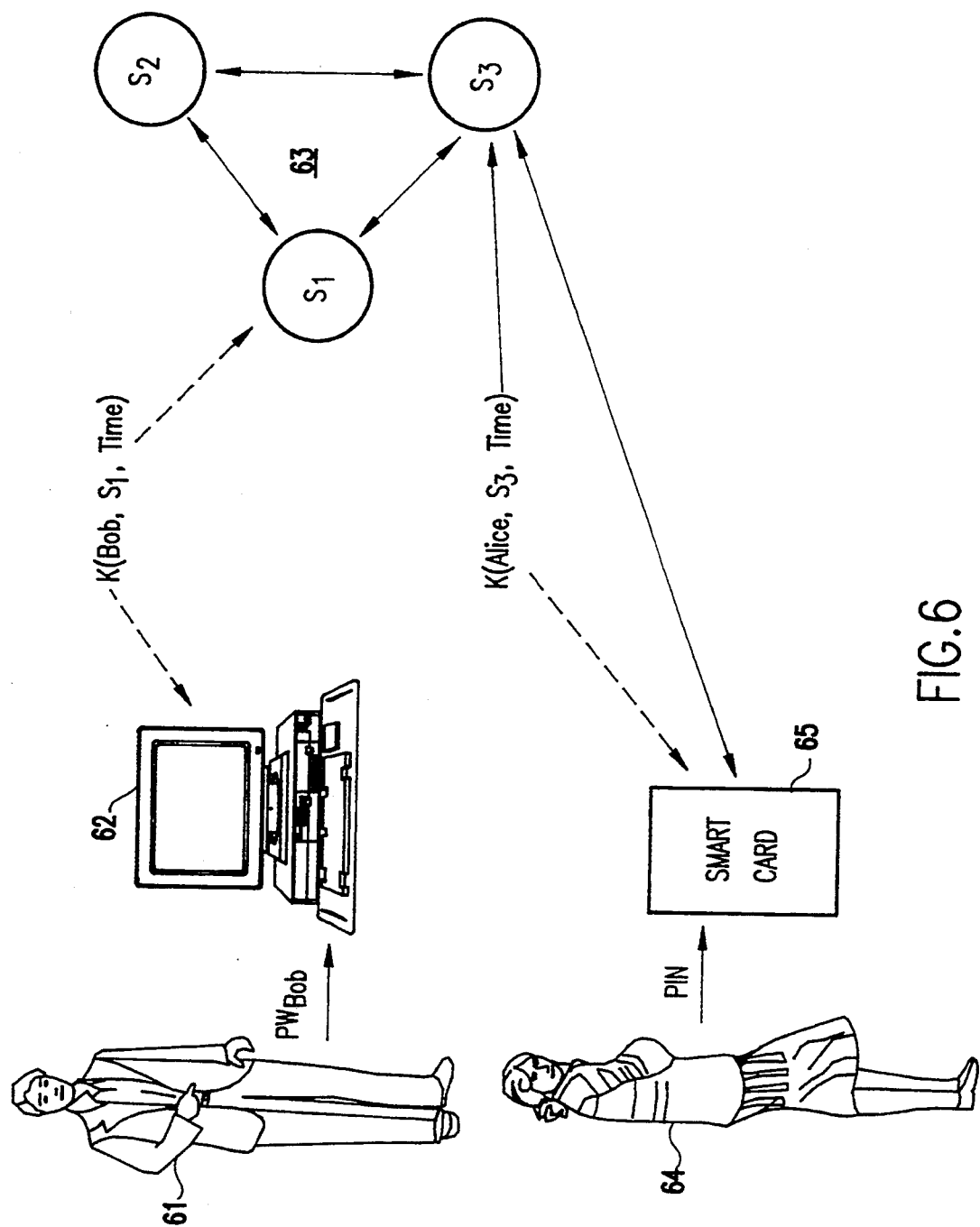
FIG. 6 is a functional block diagram showing an application of the invention to authenticate uses of a distributed system.

FIG. 6 illustrates an application of the invention for authenticating users. User 61 inputs a personal identification number (PIN) or a password to a trusted (i.e., secure) workstation 62 which is connected to server $s_1$ in the distributed data processing system 63. Based on the entered PIN, workstation 62 computes a round key which is a function of the PIN, the server location and the time (round number). This key is used for the round session key to communicate with server $s_1$. Server $s_1$ obtains this key by the methods of this invention. Alternatively, user 64 uses a so-called "smart card" 65, having a processor and a secure memory, in which the user's PIN is embedded. The PIN is used by the "smart card" 65 to authenticate the user and computer a round session key as a function of the server identity and the time (round number).

While the invention has been described in terms of certain preferred embodiments, those skilled in the art will recognize that the invention can be practiced with modification within the spirit and scope of the appended claims.

Having thus described our invention, what we claim as new and desire to secure by Letters Patent is as follows:

1. A method that allows a set of servers in a distributed data processing system to maintain a set of keys securely secret, shared with a client, in the presence of mobile eavesdroppers that occasionally break into servers and learn the entire contents of their memories, the method being performed by each server in the set of servers and comprising the steps of:

reading a current secret key from storage for a server;
computing messages for each other server in said set of servers based on the current secret key read from storage;
transmitting the computed messages to a corresponding server in said set of servers;
receiving messages from other servers in said set of servers;
using the received messages to compute a new secret key;
storing the computed new secret key in said storage for the processor; and
then erasing the current secret key from storage, whereby keys are periodically changed by and among the servers in said set of servers.

2. The method recited in claim 1 wherein the servers are synchronized, meaning that communication proceeds in rounds, and the current secret key is denoted as $k_{i,l-1}$ and the new secret key as $k_{i,l}$, where i is a number identifying the processor and l is a round, said step of computing intermediate values being performed according to $$IV_{i(j)} = \begin{matrix} INT\ VALUE \\ FROM\ i\ TO\ j \end{matrix} = f_{k_{i,l-1}}(j)$$

where j is a number identifying another server in the set of servers $j = 1, \ldots, n$, n being a total number of servers in the set of servers, and f being a function of the current secret key.

3. The method recited in claim 2 wherein the step of computing a new secret key, $N_i$, for the server is performed according to $$N_i = NEW\ SECRET = \sum_{j=1}^{n} IV_j(i),$$

where the sum operation is the exclusive OR or the modular addition of all elements.

4. A method for updating secret values by two or more processors connected by a communication system, the method being performed by each processor and comprising the steps of:

locally computing at each processor, using current secret values, messages for each of the other processors in the communication system;
transmitting the computed messages to the other processors;
upon receiving transmitted messages from the other processors, computing new secret values at each processor as a function of the received messages and the current secret value; and
at each processor, storing the computed new secret value and then erasing the current secret value, whereby secret values are periodically updated by and among the processors connected in the communication system.

5. The method of claim 4 wherein the step of locally computing messages includes computing messages for each processor by each processor using the processor's current secret value.

6. The method of claim 5 wherein the step of computing new secret values at each processor is performed as the exclusive OR of the received messages.

7. The method of claim 5 wherein the processors are synchronized, meaning that communication proceeds in rounds, and the current secret value is denoted as $k_{i,l-1}$ and the new secret value as $k_{i,l}$, where i is a number identifying the processor and l is a round, said step of computing messages being performed according to $$IV_{i(j)} = \begin{matrix} INT\ VALUE \\ FROM\ i\ TO\ j \end{matrix} = f_{k_{i,l-1}}(j)$$

where j is a number identifying another processor in the communication system $j = 1, \ldots, n$, n being a total number of processors, and being a function of the current secret value.

8. The method of claim 7 wherein the step of computing a new secret value, $N_i$, for the processor is performed according to $$N_i = \text{NEW SECRET} = \sum_{j=1}^{n} IV_j(i),$$

where the sum operation is the exclusive OR or the modular addition of all elements.

9. A method of authenticating users of a distributed data processing system comprising a plurality of servers connected by a communications network, comprising the steps of:
   entering, by a user, a user identification to an input device to the distributed data processing system, said input device being attached to one of the servers of the system;
   computing by the input device a round key based on the user identification and time, said round key being a key which is valid for a specific time and server;
   using the computed round key to communicate with the server attached to the input device;
   reading by the server current secret key from storage within said server;
   computing by the server messages for each other server of the system based on the current secret key read from storage;
   transmitting the computed messages to a corresponding server in said data processing system;
   receiving messages from other servers in said data processing system;
   using the received messages to compute a new secret key;
   storing the computed new secret key in said storage for the server; and
   then erasing the current secret key from storage, whereby keys are periodically changed by and among the servers in said data processing system.

10. The method recited in claim 9 wherein the user identification is a personal identification number (PIN) or a password and the step of computing a round key includes a server location as a variable in the computation.

11. The method recited in claim 9 wherein the input device is a workstation and the user enters a user identification by means of a keyboard attached to the workstation.

12. The method recited in claim 9 wherein the input device is a smart card having a processor and a secure memory, the user identification being embedded in the secure memory.

* * * * *